United States Patent
Yilmaz et al.

(10) Patent No.: US 9,730,134 B2
(45) Date of Patent: Aug. 8, 2017

(54) METHOD AND APPARATUS FOR HANDOVER OF DEVICE-TO-DEVICE COMMUNICATIONS

(71) Applicant: Nokia Technologies Oy, Espoo (FI)

(72) Inventors: Osman Yilmaz, Espoo (FI); Zexian Li, Espoo (FI); Mikko Uusitalo, Helsinki (FI); Martti Moisio, Klaukkala (FI)

(73) Assignee: Nokia Technologies Oy, Espoo (FI)

( * ) Notice: Subject to any disclaimer, the term of this patent is extended or adjusted under 35 U.S.C. 154(b) by 14 days.

(21) Appl. No.: 14/773,302

(22) PCT Filed: Mar. 8, 2013

(86) PCT No.: PCT/CN2013/072368
§ 371 (c)(1),
(2) Date: Sep. 4, 2015

(87) PCT Pub. No.: WO2014/134831
PCT Pub. Date: Sep. 12, 2014

(65) Prior Publication Data
US 2016/0021594 A1    Jan. 21, 2016

(51) Int. Cl.
*H04W 36/30* (2009.01)
*H04W 8/00* (2009.01)
*H04W 88/08* (2009.01)

(52) U.S. Cl.
CPC .......... *H04W 36/30* (2013.01); *H04W 8/005* (2013.01); *H04W 88/08* (2013.01)

(58) Field of Classification Search
CPC ...... H04W 36/30; H04W 8/005; H04W 88/08
See application file for complete search history.

(56) References Cited

U.S. PATENT DOCUMENTS

| 7,831,252 | B2* | 11/2010 | Shang | 370/331 |
| 9,191,961 | B2* | 11/2015 | Jang | H04W 72/082 |
| 2007/0111742 | A1* | 5/2007 | Zhang | H04W 72/044 |
| | | | | 455/517 |

(Continued)

FOREIGN PATENT DOCUMENTS

CN    102647246    8/2012
JP    2007-512752 A    5/2007

(Continued)

OTHER PUBLICATIONS

"3rd Generation Partnership Project; Technical Specification Group SA; Feasibility Study for Proximity Services ProSe) (Release 12)", 3GPP TR 22.803, V1.0.0, Aug. 2012, pp. 1-33.

(Continued)

*Primary Examiner* — Ian N Moore
*Assistant Examiner* — Latresa McCallum
(74) *Attorney, Agent, or Firm* — Alston & Bird LLP

(57) ABSTRACT

Methods and apparatuses for handover of device-to-device (D2D) communications have been disclosed. A method may comprise: receiving, from a first device of a D2D cluster, a first measurement report which indicates a handover of the first device is needed; and determining, according to a D2D handover condition, whether to initiate or postpone the handover based on the first measurement report. In some embodiments, the first measurement report is sent by the first device in response to meeting the D2D handover condition.

16 Claims, 8 Drawing Sheets

(56) References Cited

U.S. PATENT DOCUMENTS

| | | |
|---|---|---|
| 2010/0261469 A1 | 10/2010 | Ribeiro et al. |
| 2011/0275382 A1* | 11/2011 | Hakola ............... H04W 24/10 455/452.2 |
| 2012/0230260 A1 | 9/2012 | Virtej et al. |
| 2013/0102314 A1* | 4/2013 | Koskela ............ H04W 36/0072 455/436 |
| 2013/0324114 A1 | 12/2013 | Raghothaman et al. |
| 2014/0105178 A1* | 4/2014 | Jang ................. H04W 36/0055 370/331 |
| 2015/0230144 A1 | 8/2015 | Wu et al. |

FOREIGN PATENT DOCUMENTS

| | | |
|---|---|---|
| JP | 2015-521455 A | 7/2015 |
| JP | 2016-501455 A | 1/2016 |
| WO | 2005/053346 A1 | 6/2005 |
| WO | 2011/109027 A1 | 9/2011 |
| WO | 2011/116017 A1 | 9/2011 |
| WO | 2011138495 | 11/2011 |
| WO | 2011/147462 A1 | 12/2011 |
| WO | 2012/161549 A2 | 11/2012 |
| WO | 2012/173443 A2 | 12/2012 |
| WO | 2013013510 | 1/2013 |
| WO | 2014/084028 A1 | 6/2014 |
| WO | 2014/105178 A1 | 7/2014 |

OTHER PUBLICATIONS

Phunchongharn et al., "Resource Allocation for Device-To-Device Communications Underlaying LTE-Advanced Networks", IEEE Wireless Communications, vol. 20, No. 4, Aug. 2013, pp. 1-21.

Office action received for corresponding Japanese Patent Application No. 2015-560514, dated Sep. 5, 2016, 5 pages of office action and no pages of office action translation available.

Extended European Search Report received for corresponding European Patent Application No. 13877130.8, dated Sep. 28, 2016, 11 pages.

International Search Report and Written Opinion received for corresponding Patent Cooperation Treaty Application No. PCT/CN2013/072368, dated Dec. 12, 2013, 11 pages.

* cited by examiner

D2D optimal path ————
Cellular connectivity — — — — —

D2D optimal path ————
Cellular connectivity — — — — —

METHOD AND APPARATUS FOR HANDOVER OF DEVICE-TO-DEVICE COMMUNICATIONS

RELATED APPLICATION

This application was originally filed as PCT Application No. PCT/CN2013/072368 filed Mar. 8, 2013.

TECHNICAL FIELD

Embodiments of the present invention generally relate to wireless communications, and more particularly to methods, apparatuses, computer-readable storage mediums and computer program products for handover of device-to-device (D2D) communications.

BACKGROUND

This section introduces aspects that may help to facilitate a better understanding of the invention(s). Accordingly, the statements of this section are to be read in this light and are not to be understood as admissions about what is in the prior art or what is not in the prior art.

Currently, when two user equipments (UEs) in close proximity communicate with each other, their data path goes via the operator network. The typical data path for this type of communication may be referred to as infrastructure cellular mode, where enhanced Node B (eNB) and/or gateway(s) (GW(s)) are involved.

In addition, Device-to-Device (D2D) communications are discussed extensively as candidate for essential enablers for future wireless communication systems-5G (the $5^{th}$ generation). If UEs are in proximity of each other, they may be able to use a local or direct path.

FIG. 1 shows a proximity communication scenario where two UEs communicate using a locally-routed (optimized) path via eNB, which may be referred to as locally-routed mode. As shown in FIG. 1, two UEs (UE1, UE2) and two eNBs (eNB1, eNB2) are shown for illustration. The two UEs communicate via the eNB1 and they are both served by the same eNB and exchange control information with the eNB (or other nodes of the network).

FIG. 2 shows another proximity communication scenario where two UEs communicate using a direct path, which may be referred to as direct mode. As shown in FIG. 2, two UEs (UE1, UE2) and two eNBs (eNB1, eNB2) are shown for illustration. The two UEs communicate via a direct path therebetween.

D2D communication provides low power and high data rate communications between end-users. Also due to the local process at device itself or eNB (for optimized path), the communication latency can be really short. However, it is not always possible to provide low latency reliable communication between users due to mobility. For instance, if due to mobility, one UE of the D2D pair needs to handover to another eNB, due to the possible non-ideal backhaul connection between eNBs, it is not easy to keep the ongoing delay-sensitive applications.

In WO2011/109027A1, methods for D2D handovers are provided. The methods hand over both D2D devices rather than maintaining a multi-cell D2D configuration in which each D2D device is coupled to a separate base station.

SUMMARY

To better address one or more of the above concerns, a handover mechanism for D2D communications has been proposed in the present invention.

In a first aspect of the invention, there is provided a method, which comprises: receiving, from a first device of a device-to-device (D2D) cluster, a first measurement report which indicates that a handover of the first device is needed; and determining, according to a D2D handover condition, whether to initiate or postpone the handover based on the first measurement report.

In some embodiments, the first measurement report is sent by the first device in response to meeting the D2D handover condition.

In some embodiments, initiating the handover may comprise: requesting at least one second measurement report from at least one second device of the D2D cluster if there is no valid measurement report of the at least one second device; requesting a valid first measurement report from the first device if the first measurement report has expired; and selecting, according to a predefined criterion, a best target cell or a best target base station for a joint handover of the first device and the at least one second device at least partly based on the valid first and the at least one second measurement reports.

In some embodiments, the method may further comprise: upon a failure of the joint handover to the best target cell or the best target base station, selecting, according to the predefined criterion, a next-best target cell or a next-best target base station based on the valid first and the at least one second measurement reports.

In some embodiments, the predefined criterion is based on at least on of: signal condition; quality of service (QoS) requirements of both cellular service and D2D service of the first device and the at least one second device; and service priorities of both cellular service and D2D service of the first device and the at least one second device.

In some embodiments, postponing the handover may comprise: sending a message to the first device, the message instructing the first device to control the sending of measurement report.

In some embodiments, the message may comprise one or more of the following: the D2D handover condition for triggering the sending of measurement report; a delay duration for postponing the sending of measurement report; and a request for measurement report.

In some embodiments, the D2D handover condition includes at least one of a signal strength threshold, a signal quality threshold, and a quality of service (QoS) threshold of both cellular service and D2D service.

In some embodiments, the method may further comprise: initiating, prior to said determining, a joint handover of the D2D cluster to a target base station or cell if the target base station or cell meets a cellular handover condition of all the devices in the D2D cluster.

In a second aspect of the invention, there is provided a method, which comprises: sending, by a first device of a device-to-device (D2D) cluster, a first measurement report to a source base station of the first device. The first measurement report indicates that a handover of the first device is needed and causes the source base station to determine, according to a D2D handover condition, whether to initiate or postpone the handover based on the first measurement report.

In some embodiments, the sending comprises: sending the first measurement report in response to meeting the D2D handover condition.

In some embodiments, the method may further comprise receiving a message from the source base station, the message instructing the first device to control the sending of measurement report.

In some embodiments, the method may further comprise: receiving from the source base station, a handover command to hand over to a target cell or a target base station. The target cell or the target base station is selected by the source base station, according to a predefined criterion, at least partly based on the first measurement report and measurement report requested from at least one second device of the D2D cluster.

In a third aspect of the invention, there is provided a method, which comprises: determining, by a first device of a device-to-device (D2D) cluster in response to meeting a cellular handover condition, whether a D2D handover condition is met; and sending, by the first device, a cell measurement command to at least one second device of the D2D cluster if it is determined that the D2D handover condition is met.

In some embodiments, the method further comprises: receiving at least one second measurement report from the at least one second device; and selecting, according to a predefined criterion, a best target cell or a best target base station for a joint handover of the first device and the at least one second device at least partly based on the at least one second measurement report.

In some embodiments, the method may further comprise: upon a failure of the joint handover to the best target or the best target base station, selecting, according to the predefined criterion, a next-best target cell or a next-best target base station based on the at least one second measurement report.

In a fourth aspect of the invention, there is provided a method, which comprises: receiving, at a second device of a device-to-device (D2D) cluster, a cell measurement command. The cell measurement command is triggered by a first device of the D2D cluster meeting a D2D handover condition. The method further comprises: sending a measurement report in response to the cell measurement command.

In some embodiments, the method further comprises: receiving a handover command to hand over to a target cell or a target base station. The target cell or the target base station is selected, according to a predefined criterion, at least partly based on the measurement report of the second device.

In some embodiments, the cell measurement command is sent by the first device. In some embodiments, the cell measurement command is sent by a base station.

In a fifth aspect of the invention, there is provided an apparatus, comprising: at least one processor; and at least one memory including computer program code. The at least one memory and the computer program code are configured to, with the at least one processor, cause the apparatus at least to: receive, from a first device of a device-to-device (D2D) cluster, a first measurement report which indicates that a handover of the first device is needed; and determine, according to a D2D handover condition, whether to initiate or postpone the handover based on the first measurement report.

In a sixth aspect of the invention, there is provided an apparatus, comprising: at least one processor; and at least one memory including computer program code. The at least one memory and the computer program code are configured to, with the at least one processor, cause the apparatus at least to: send, by a first device of a device-to-device (D2D) cluster, a first measurement report to a source base station of the first device. The first measurement report indicates that a handover of the first device is needed and causes the source base station to determine, according to a D2D handover condition, whether to initiate or postpone the handover based on the first measurement report.

In a seventh aspect of the invention, there is provided an apparatus, comprising: at least one processor; and at least one memory including computer program code. The at least one memory and the computer program code are configured to, with the at least one processor, cause the apparatus at least to: determine, by a first device of a device-to-device (D2D) cluster in response to meeting a cellular handover condition, whether a D2D handover condition is met; and send, by the first device, a cell measurement command to at least one second device of the D2D cluster if it is determined that the D2D handover condition is met.

In an eighth aspect of the invention, there is provided an apparatus, comprising: at least one processor; and at least one memory including computer program code. The at least one memory and the computer program code are configured to, with the at least one processor, cause the apparatus at least to: receive, at a second device of a device-to-device (D2D) cluster, a cell measurement command. The cell measurement command is triggered by a first device of the D2D cluster meeting a D2D handover condition. The apparatus is further caused to: send a measurement report in response to the cell measurement command.

In a ninth aspect of the invention, there is provided an apparatus comprising: means for receiving, from a first device of a device-to-device (D2D) cluster, a first measurement report which indicates that a handover of the first device is needed; and means for determining, according to a D2D handover condition, whether to initiate or postpone the handover based on the first measurement report.

In a tenth aspect of the invention, there is provided an apparatus, comprising: means for sending, by a first device of a device-to-device (D2D) cluster, a first measurement report to a source base station of the first device. The first measurement report indicates that a handover of the first device is needed and causes the source base station to determine, according to a D2D handover condition, whether to initiate or postpone the handover based on the first measurement report.

In an eleventh aspect of the invention, there is provided an apparatus, comprising: means for determining, by a first device of a device-to-device (D2D) cluster in response to meeting a cellular handover condition, whether a D2D handover condition is met; and means for sending, by the first device, a cell measurement command to at least one second device of the D2D cluster if it is determined that the D2D handover condition is met.

In a twelfth aspect of the invention, there is provided an apparatus, comprising: means for receiving, at a second device of a device-to-device (D2D) cluster, a cell measurement command. The cell measurement command is triggered by a first device of the D2D cluster meeting a D2D handover condition. The apparatus further comprises: means for sending a measurement report in response to the cell measurement command.

In a thirteenth aspect of the invention, there is provided a computer-readable storage media having computer program code stored thereon, the computer program code configured to, when executed, cause an apparatus to perform actions in the method according to any one of embodiments of the first aspect, the second aspect, the third aspect, and the fourth aspect of the present invention.

In a fourteenth aspect of the present invention, there is provided a computer program product comprising a computer-readable storage media according to the thirteenth aspect of the present invention.

Particular embodiments of the subject matter described in this specification can be implemented so as to realize one or more of the following advantages.

With particular embodiments of the techniques described in this specification, a novelty handover condition, i.e., the D2D handover condition, is introduced in the process of handover. According to the D2D handover condition, a normal cellular handover may be postponed. In this way, all UEs within a same D2D cluster are made under a same eNB as much as possible, so that latency critical application via D2D communications can be served. With the proposed handover mechanism for D2D communications, more efficient D2D control can be achieved via as small amount of eNBs controlling the operation as possible. Further, the proposed handover mechanism can be applied in not only the case of D2D locally-routed path via eNB, but only the case of D2D direct path.

Other features and advantages of the embodiments of the present invention will also be understood from the following description of specific embodiments when read in conjunction with the accompanying drawings, which illustrate, by way of example, the principles of embodiments of the present invention.

BRIEF DESCRIPTION OF THE DRAWINGS

The above and other aspects, features, and benefits of various embodiments of the invention will become more fully apparent, by way of example, from the following detailed description and the accompanying drawings, in which.

Like reference numbers and designations in the various drawings indicate like elements.

DETAILED DESCRIPTION

Figure 1:
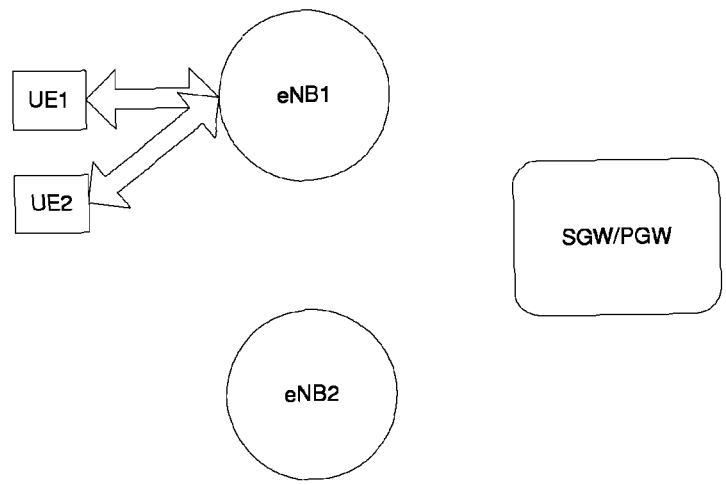
FIG. 1 exemplarily illustrates a proximity communication scenario where two UEs communicate using a locally-routed (optimized) path via eNB.
Figure 2:
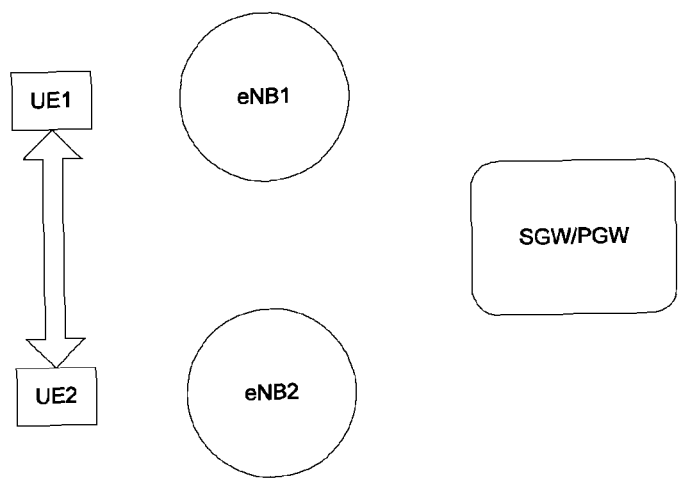
FIG. 2 exemplarily illustrates another proximity communication scenario where two UEs communicate using a direct path.

Hereinafter, the principle and spirit of the present invention will be described with reference to the illustrative embodiments. It should be understood, all these embodiments are given merely for the skilled in the art to better understand and further practice the present invention, but not for limiting the scope of the present invention. For example, features illustrated or described as part of one embodiment may be used with another embodiment to yield still a further embodiment. In the interest of clarity, not all features of an actual implementation are described in this specification.

As mentioned above, embodiments of the present invention have provided a handover mechanism for D2D communications. In the following description, the proposed mechanism will be detailed with respect to exemplary embodiments illustrated in the drawings. Although the case of UE to UE locally-routed path via eNB is taken as an example, the skilled in the art could appreciate that the proposed mechanism may be also applied in other cases, for example the case of UE to UE direct path and the case of idle mode during cell selection.

Figure 3A:
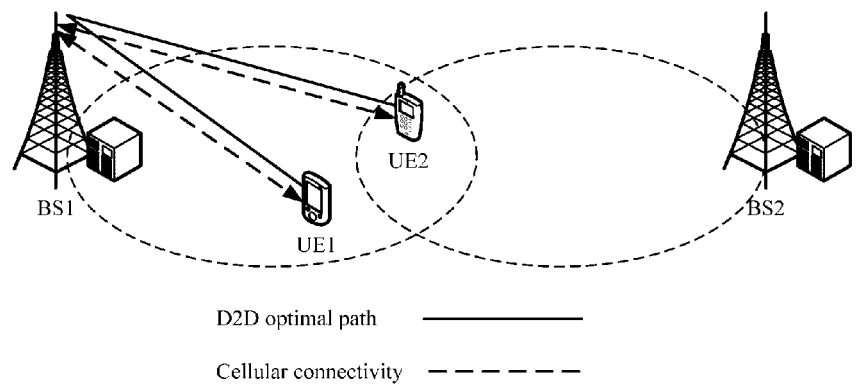
FIG. 3a illustrates one example scenario before applying embodiments of the present invention.

FIG. 3a illustrates one example scenario before applying embodiments of the present invention. In the shown scenario, there are two base stations (BSs), each supporting a coverage area (also referred to as a cell). The base stations BS1 and BS2 are capable of communicating with wireless devices, such as UE1 and UE2 within the coverage area. Although only two mobile UEs, two base stations (BSs), and two coverage areas are shown for illustration, the skilled in the art could appreciate that other quantities of UEs, BSs, and coverage areas may be implemented as well.

In some implementations, the base station BS1 and BS2 are implemented as an evolved Node B (eNB) type base station consistent with standards, including the Long Term Evolution (LTE) standards. The base station BS1 and BS2 may also be implemented consistently with the Institute of Electrical and Electronic Engineers (IEEE) 802.16 standards. The base station BS1 and BS2 may have wired and/or wireless backhaul links to other network nodes, such as other base stations, a radio network controller, a core network, a serving gateway, and the like.

The user equipments UE1 and UE2 may be mobile and/or stationary. Moreover, the user equipments UE1 and UE2 may be referred to as, for example, devices, mobile station, mobile units, subscriber stations, wireless terminals, terminals, or the like. The user equipments UE1 and UE2 may be implemented as, for example, a wireless handheld device, a wireless plug-in accessory, or the like. For example, the user equipments UE1 and UE2 may take the form of a wireless phone, a computer with a wireless connection to a network, or the like. In some cases, the user equipment may include one or more of the following: at least one processor, at least one computer-readable storage medium (e.g., memory, storage, and the like), a radio access mechanism, and a user interface.

As shown in FIG. 3a, two mobile UEs have simultaneous cellular connection to the same base station (e.g., BS1 as shown), the cellular connection being indicated by dotted lines. The two UEs also have active optimized path D2D communications via the same base station (e.g., BS1), the D2D optimized path being indicated by solid lines. For example, UE1 and UE2 have an ongoing delay sensitive D2D application. Herein, the phrase "a D2D cluster" used refers to a cluster of devices where every two devices have direct or indirect association via D2D communication.

In addition to a normal handover condition, a novel handover condition is introduced. For the purpose of clarity and explanation, the normal handover condition is referred to as "cellular handover condition", and the newly introduced handover condition is referred to as "D2D handover condition." The D2D handover condition may include at least one of a signal strength threshold, a signal quality threshold (e.g., signal to noise ratio (SNR), etc.), and a quality of service (QoS) threshold of both cellular service and D2D service.

Please be noted that the D2D handover condition may correspond to different indicators in BS and UE sides. For instance, on UE side it could be reference signal received quality (RSRQ) but on network side it could be channel quality indicator (CQI). In some embodiments, the D2D handover condition may have the same indicator e.g., RSRQ on both sides.

If one of the UEs (e.g., UE1) in the D2D cluster moves towards a new base station (e.g., BS2 as shown) and fulfills the cellular handover condition to the new base station BS2, the network (e.g. BS1) may postpone a normal handover until the signal condition (e.g., signal strength, signal quality, etc.) is worse than the predefined D2D handover condition. However, if all the devices in the D2D cluster fulfill the cellular handover condition to a same target base station (co-sited cells) or preferably to a same cell, a joint handover can be triggered without a further delay. In this way, the D2D latency could be kept as minimal as possible.

Alternatively, the D2D handover condition may be broadcasted to all UEs or all D2D-capable UEs or sent to certain UEs (e.g., which have active D2D communications) with dedicated signaling. Using this D2D handover condition, handover of UE1 is triggered later with respect to a normal handover.

If handover is necessary, i.e., signal condition worse than the D2D handover condition, which also means that the D2D service may not be guaranteed, then network requests measurements from all devices within the same D2D cluster in case there is no available measurement report in disposal. Requested measurements do not target only the original target bases station or the target cell of UE1 but also any other detected cell of UE1 that is of signal condition better than the D2D handover condition.

Upon obtaining the measurements, BS1 may request a joint handover to the best candidate base station or preferably a single cell. While selecting the best target base station or cell, in addition to signal condition, quality of service (QoS) requirements and service priorities of both cellular and D2D applications can be taken into account.

If the request is not accepted (e.g., due to admission control) for a device in the D2D cluster, the handover request is re-sent but to the following best candidate base station or preferably a single cell. Therefore, in the end, the final destination of the devices in the D2D cluster may be different than the original target base station or the target cell of UE1.

Figure 3B:
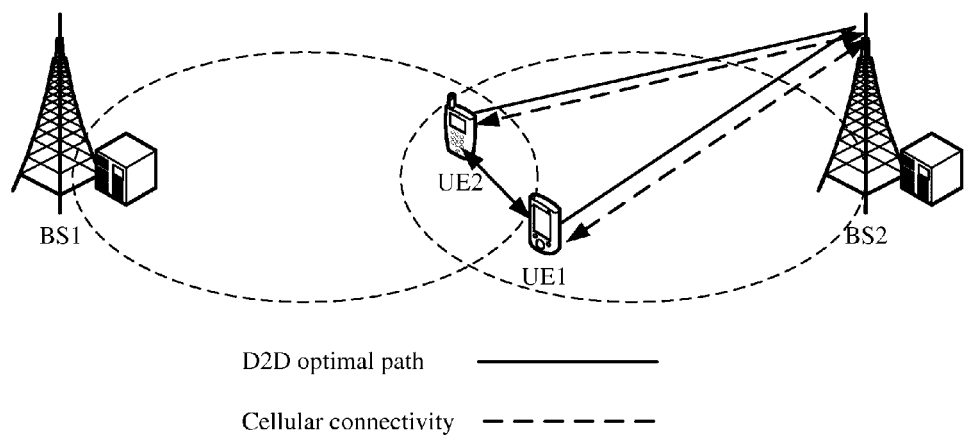
FIG. 3b illustrates the example scenario of FIG. 3 after applying embodiments of the present invention.

FIG. 3b illustrates the example scenario of FIG. 3a after applying embodiments of the present invention, i.e., after a joint handover of the two UEs to the target base station.

As shown in FIG. 3b, the two UEs are handed over to BS2 according to the handover mechanism proposed herein. Now, they have simultaneous cellular connection to BS2 as indicated by dotted lines, and they also have active optimized path D2D communications via BS2 as indicated by solid lines. Namely, after handover, the two UEs stay under a same base station and preferable in a same cell again, and thus the D2D path can continue to provide low latency reliable communications.

It is noted that, the term "base station" used herein may refer a single cell or a site consists of multiple cells, e.g., a three-sector site. According to embodiments of the present invention, the devices of a D2D cluster may be made to stay under a same base station and preferably in a same cell (or sector) although the latency would be low enough between the co-sited cells.

Also in the case of UE to UE direct path, similar handover may take place to allow all UEs in a same D2D cluster to be in cellular connection to the same base station as much as possible. This would facilitate also the UE to UE direct path, as it is controlled by the eNB.

It is worth noting that if UEs support dual mode connectivity, handovers due to cellular connectively and D2D could be managed independently. However, radio resource management for parallel applications through a single cell may be still easier and preferable thereof in the case of dual mode connectivity.

Additionally, in some cases, the cellular connection (RRC_CONNECTED) can be released due to signaling reduction and/or power saving reasons as studies e.g., in 3GPP Work Item "LTE RAN Enhancements for Diverse Data Applications", although there could be some applications sending intermittent data. In this case, the proposed handover mechanism can be applied also for idle mode during cell selection, so that the devices stay under the same site as much as possible.

The above thus has briefly described the proposed handover mechanism according to embodiments of the present invention. It can be seen that the handover of UE2 is triggered due to the D2D communication with UE1, and thus the proposed handover mechanism may be called as D2D triggered handover mechanism. At below, more detailed handover process is described with reference to signaling diagrams. In the figures, exemplary signaling for a single mode connectivity case is given for illustration.

Figure 4:
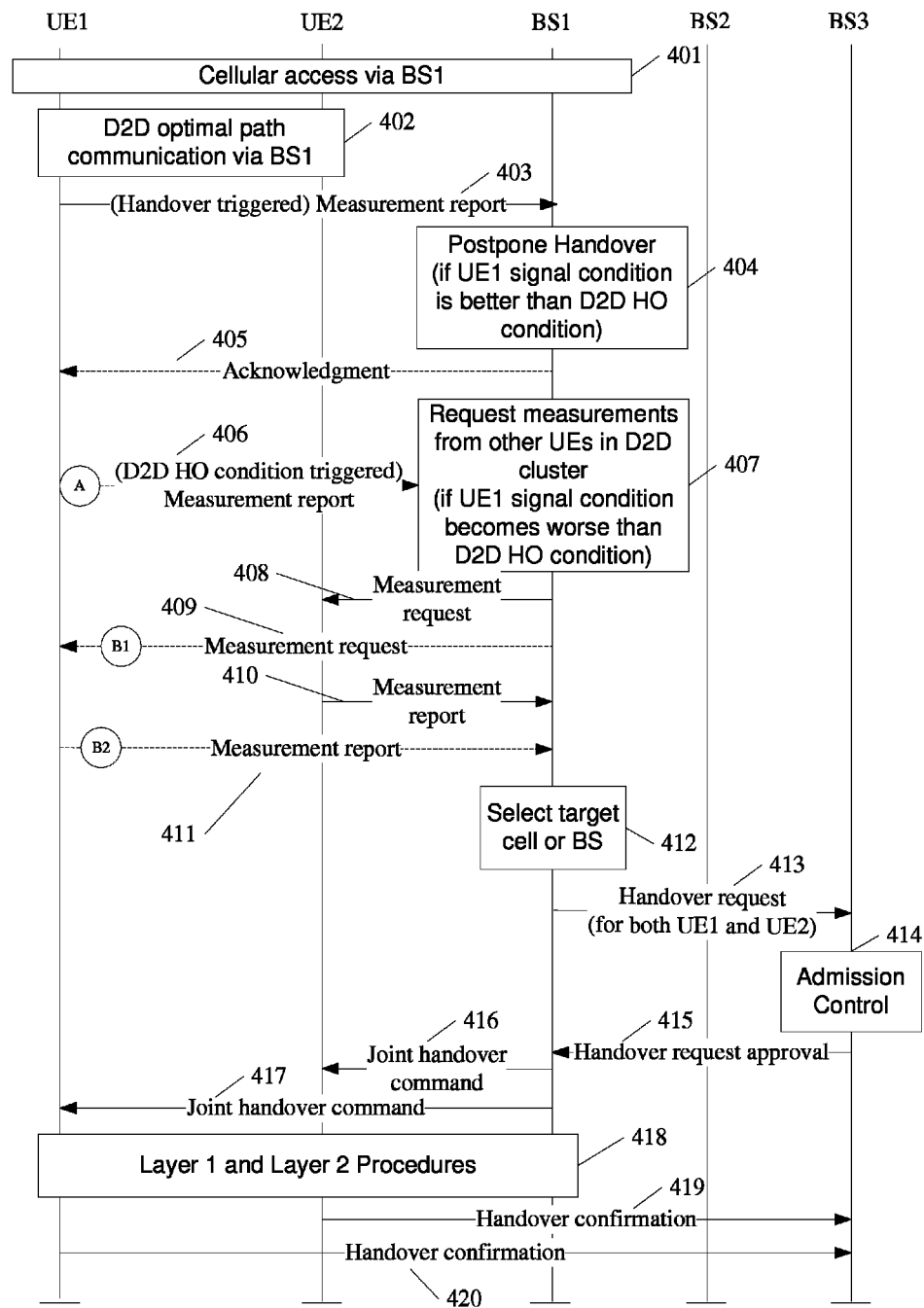
FIG. 4 illustrates an exemplary signaling diagram for D2D triggered handover process according to one embodiment of the present invention.

FIG. 4 illustrates an exemplary signaling diagram for D2D triggered handover process according to one embodiment of the present invention. Also, two UEs and two BSs are shown for illustration.

As shown in block 401, UE1 and UE2 have simultaneous cellular connection to BS1. In addition, as shown in block 402, they have an on-going optimized D2D path via BS1 by which a delay sensitive D2D application is in use.

The BS1 (i.e., source BS) has configured the measurement procedure of UE1 and UE2 according to area restriction information. Measurement Configuration may include measurement objects, reporting configurations (including measurement trigger by Event or Period, measurement report contents, etc.), measurement identities, measurement gaps, etc. The event-triggered period measurement report criteria may be, for example A3 as defined in LTE. Event A3 is that neighbor cell becomes better than an offset relative to the serving cell, i.e., cellular handover condition.

If UE1 moves and satisfies an event-triggered reporting criteria (i.e., cellular handover condition, such as A3 described in LTE), then at step 403, UE1 will send a measurement report to the source BS1 according to its measurement configuration, such as sending measurement report periodically. The measurement report may include measurement result such as a reference signal received quality (RSRQ), a reference signal received power (RSRP), etc. of the source base station (BS1), a target base station (e.g., BS2) and any detectable cells. The measurement report indicates that a handover of UE1 to another base station or cell (e.g., the target base station BS2) is needed.

Upon receiving the measurement report from UE1, BS1 can determine, according to a D2D handover condition, whether to initiate or postpone the handover based on the measurement report. If the signal condition of UE1 is better than the D2D handover condition, then at step 404, BS1 can postpone the handover of UE1.

As mentioned above, the D2D handover condition may include at least one of a signal strength threshold, a signal quality threshold (e.g., signal to noise ratio (SNR), etc.), and a quality of service (QoS) threshold of both cellular service and D2D service. For example, cellular communication may be used for voice over IP (VoIP) service, while D2D communication may be used for data transmission. They can have different priorities and QoS requirements. As an example, if postponing a handover may affect the QoS of a higher priority application provided by the cellular communication, i.e., meeting the D2D handover condition, then BS1 can simply initiate the handover of UE1 in order to get a satisfying QoS.

When determining to postpone the handover of UE1, optionally, BS1 can send a message (e.g., Acknowledgement) to UE1 at step 405. The message instructs UE1 to control its sending of measurement report. In some embodiments, the message may comprise the D2D handover condition such that UE1 can subsequently use the D2D handover condition to trigger the sending of measurement report. Additionally or alternatively, the message may comprise a delay duration for postponing the sending of measurement report. If UE1 knows both the D2D handover condition and the delay duration, the event which occurs earlier can trigger the sending of measurement report. Depending on system configuration, UE1 can restart its periodical measurement and reporting, or merely perform measurement and reporting once in response to a trigger event. In this way, unnecessary event triggered reporting by UE1 may be avoided.

In some other embodiments, if another UE (i.e., all the other devices) within the same D2D cluster as UE1 wants to handover to the same target base station or preferably the same target cell while the normal cellular handover of UE1 is postponed, then BS1 can send a message comprising a request for measurement report to UE1 if no valid measurement report of UE1 is available (not shown). In such case, a joint handover of the D2D cluster can be initiated without further delay.

In still some other embodiments, if after a while, BS1 recognizes that the signal condition of UE1 meets the D2D handover condition for example by channel quality indicator or some other indicators (e.g., service quality) for on-going transmission or uplink measurements, BS1 can send a message comprising a request for measurement report to UE1 if no valid measurement report of UE1 is available (not shown).

Go on with FIG. 4. Upon receiving the message (e.g., Acknowledgement), UE1 can control its sending of measurement report, for example based on the D2D handover condition and/or the delay duration. In one embodiment, at an optional step 406, UE1 sends a measurement report to BS1 in response to meeting the D2D handover condition. As mentioned above, depending on system configuration, UE1 can restart its periodical measurement and reporting, or merely perform measurement and reporting once in response to a trigger event.

Then, BS1 can determine to initiate a handover of UE1 and at step 407, BS1 can request measurement reports from other UEs in the D2D cluster. Specifically, at step 408, BS1 can send a measurement request to other UEs (e.g., UE2) in the D2D cluster if there is no valid measurement report of those UEs. Optionally, at step 409, BS1 may send a measurement request to UE1 if a previous measurement report (e.g., received at step 406) from UE1 has expired.

Upon gathering valid measurement reports from devices in the D2D cluster at step 410 and 411, BS1 can select a best target cell or a best target base station to which the devices (e.g., UE1 and UE2) of the D2D cluster are to be handed over according to a predefined criterion at step 412.

The predefined criterion may be based on at least one of: signal condition (e.g., signal strength, signal quality such as signal to noise ratio (SNR), etc.), quality of service (QoS) requirements of both cellular service and D2D service of the devices of the D2D cluster; and service priorities of both cellular service and D2D service of the devices of the D2D cluster.

Having selected a target cell or target base station, at step 413, BS1 sends a handover (HO) request for the devices (e.g., both UE1 and UE2) of the D2D cluster to the selected target base station (e.g., BS3 in FIG. 4).

At step 414, the target base station BS3 performs admission control for UE1 and UE2, resulting in a handover request reply (e.g., approval) to source base station BS1 at 415. Based on the received handover request reply, the source base station BS1 sends joint handover command to UE1 and UE2 at step 416 and step 417, respectively.

At step 418, UE1 and UE2 reconfigure layers L1/L2 and transmit, at step 419 and step 420 respectively, a handover confirmation message to the target base station BS3.

The handover execution is similar with normal handover except that control information about the D2D cluster is also exchanged between the source base station BS1 and the target base station BS3. The control information may include, for example, an allocation of radio resources for the D2D link, a D2D cluster identifier (e.g., a new, common D2D radio network temporary identifier (RNTI) which would be valid and common to both the source and target base stations BS1 and BS3).

Having handed over to BS3, both UE1 and UE2 can have cellular access via BS3. In addition, UE1 and UE2 can continue their D2D locally-routed path communication via BS3. According to embodiments of the present invention, UE1 and UE2 are both handed over to BS3 simultaneously, so that D2D latency can be kept minimal and scheduling and signaling burden of a multi-cell D2D connection can be reduced.

In some further embodiments, upon a failure (e.g., due to admission control) of the joint handover to the best target cell or the best target base station, the source base station BS1 can select a next-best target cell or a next-best target base station based on valid measurement reports according to the predefined criterion.

Figure 5:
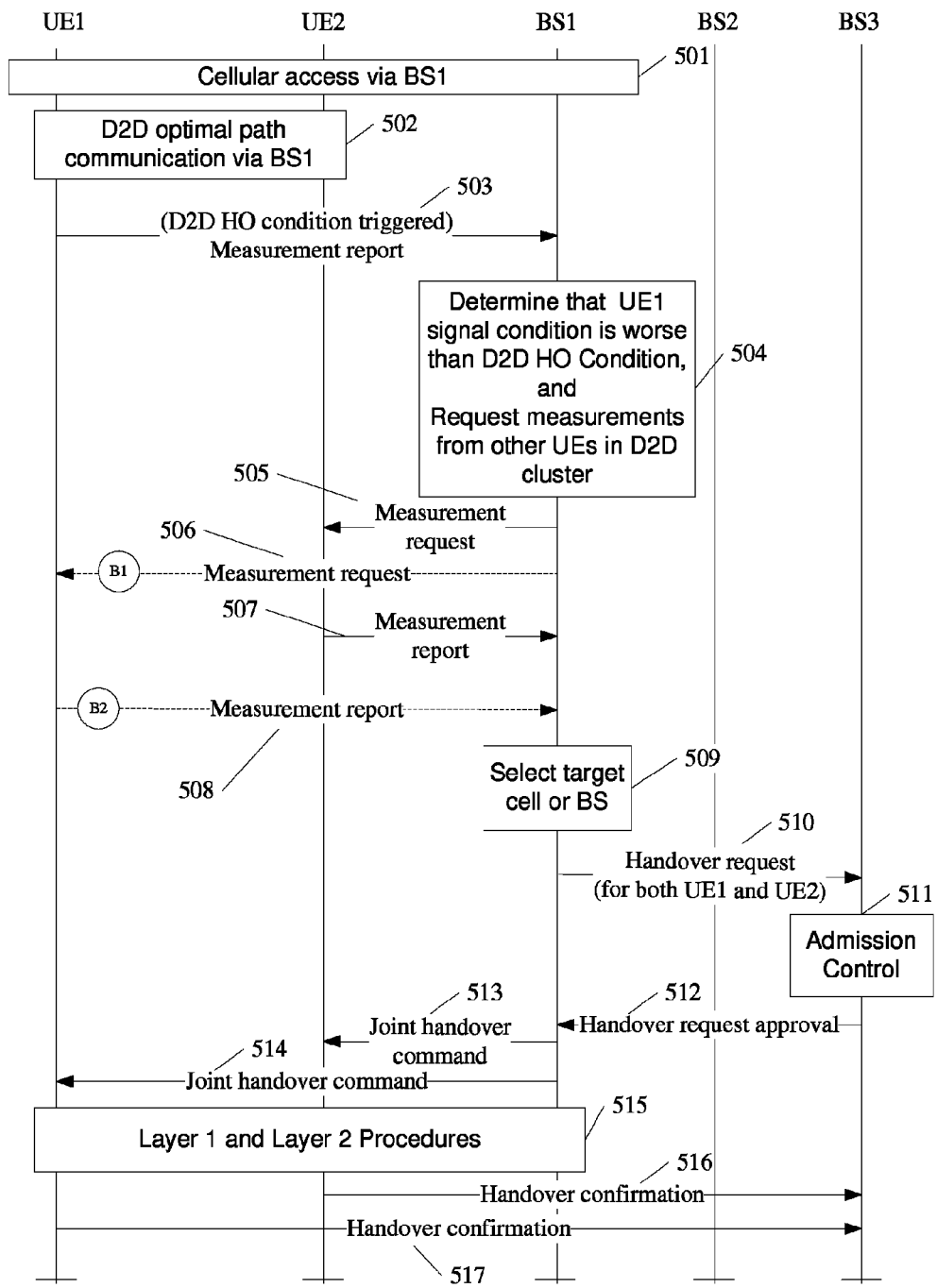
FIG. 5 illustrates an exemplary signaling diagram for D2D triggered handover process according to another embodiment of the present invention.

FIG. 5 illustrates an exemplary signaling diagram for D2D triggered handover process according to another embodiment of the present invention. In the example shown in FIG. 5, the only difference from the embodiment shown in FIG. 4 is in that UE1 postpones the sending of measurement report triggered by the cellular handover condition on its own initiative.

As shown in block 501 of FIG. 5, UE1 and UE2 have simultaneous cellular connection to BS1. In addition, as shown in block 502, they have an on-going optimized D2D path via BS1 by which a delay sensitive D2D application is in use.

The D2D handover condition may be broadcasted to all UEs or all D2D-capable UEs or sent to certain UEs (e.g., which have active D2D communications) with dedicated signaling (not shown). Using this D2D handover condition, handover of UE1 is triggered later with respect to a normal cellular handover.

Then at step 503, UE1 sends a measurement report to the source base station BS1 in response to meeting the D2D handover condition. The measurement report may include measurement result such as a reference signal received quality (RSRQ), a reference signal received power (RSRP), etc. of the source base station (BS1), a target base station (e.g., BS2) and any detectable cells. The measurement report indicates that a handover of UE1 to another base station or cell (e.g., the target base station BS2) is necessary.

Upon receiving the measurement report from UE1, at block 504, BS1 can determine, according to the D2D handover condition, that the signal condition of UE1 is worse than the D2D handover condition and a handover of UE1 is necessary. Then, BS1 can request measurement reports from other UEs in the D2D cluster.

The following steps 505-517 are the same with steps 408-420 in FIG. 4, and thus the description thereof is omitted here.

Figure 6:
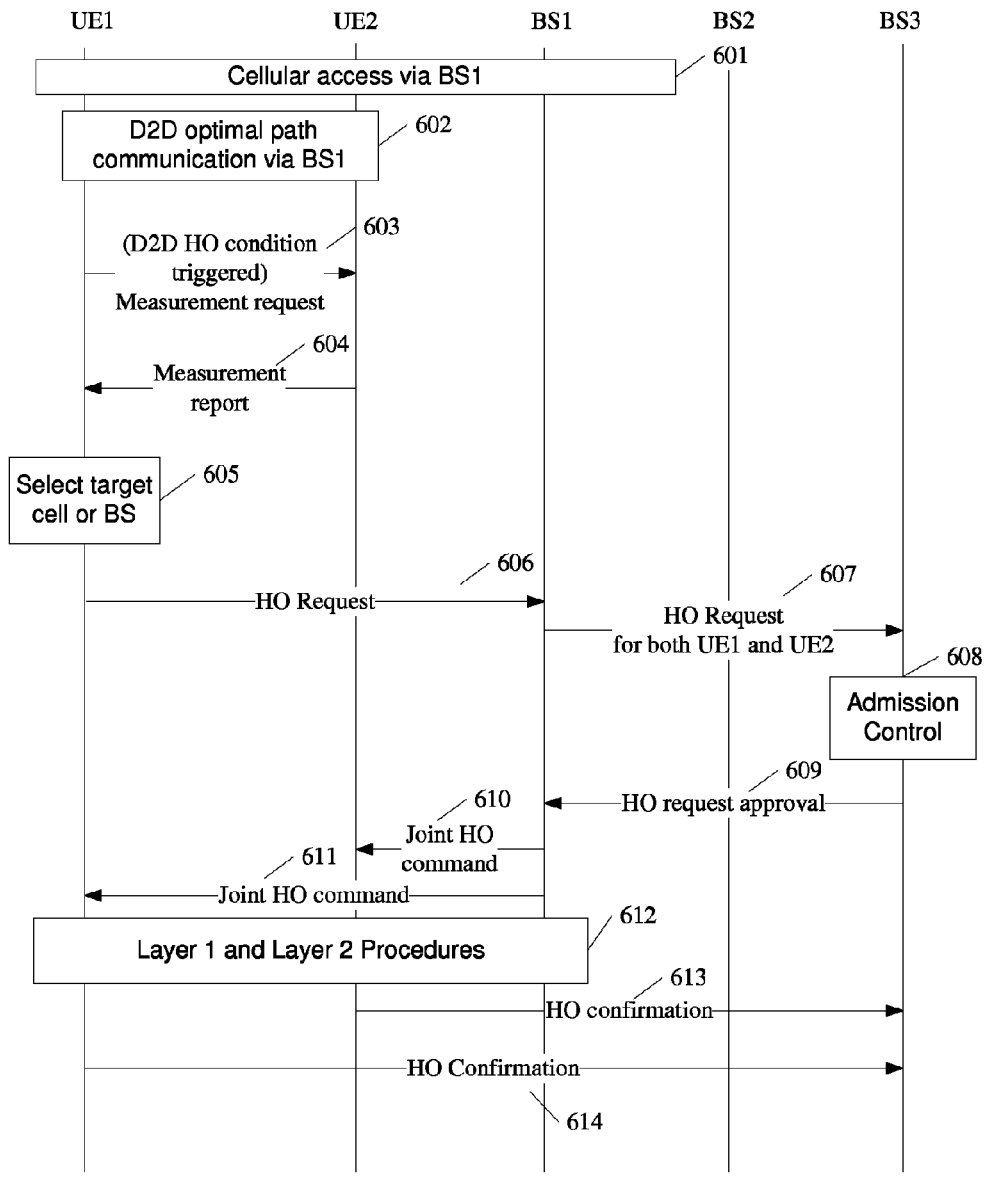
FIG. 6 illustrates an exemplary signaling diagram for D2D triggered handover process according to still another embodiment of the present invention.

FIG. 6 illustrates an exemplary signaling diagram for D2D triggered handover process according to still another embodiment of the present invention. In the example shown in FIG. 6, handover is initiated by a UE, i.e., in a UE autonomous scenario.

As shown in block 601 of FIG. 6, UE1 and UE2 have simultaneous cellular connection to BS1. In addition, as shown in block 602, they have an on-going optimized D2D path via BS1 by which a delay sensitive D2D application is in use.

The D2D handover condition may be broadcasted to all UEs or all D2D-capable UEs or sent to certain UEs (e.g., which have active D2D communications) with dedicated signaling (not shown). Using this D2D handover condition, handover of UE1 is triggered later with respect to a normal cellular handover.

Then at step 603, UE1 sends a cell measurement command/request to other UEs (e.g., UE2) in the same D2D cluster as UE1, in response to meeting the D2D handover condition.

Upon receiving a measurement report from UE2 at step 604, UE1 can select a best target cell or a best target base station to which the devices (e.g., UE1 and UE2) of the D2D cluster are to be handed over according to a predefined criterion at step 605.

As mentioned previously, the predefined criterion may be based on at least one of: signal condition (e.g., signal strength, signal quality such as signal to noise ratio (SNR), etc.), quality of service (QoS) requirements of both cellular service and D2D service of the devices of the D2D cluster; and service priorities of both cellular service and D2D service of the devices of the D2D cluster.

Having selected a target cell or target base station, at step 606, UE1 sends a handover (HO) request for the devices (e.g., both UE1 and UE2) of the D2D cluster to the source base station BS1. The handover request initiates a handover of the D2D cluster to the selected target cell or the selected target base station (e.g., BS3 in FIG. 6).

The following steps 607-614 are the same with steps 413-420 in FIG. 4, and thus the description thereof is omitted here.

Figure 7:
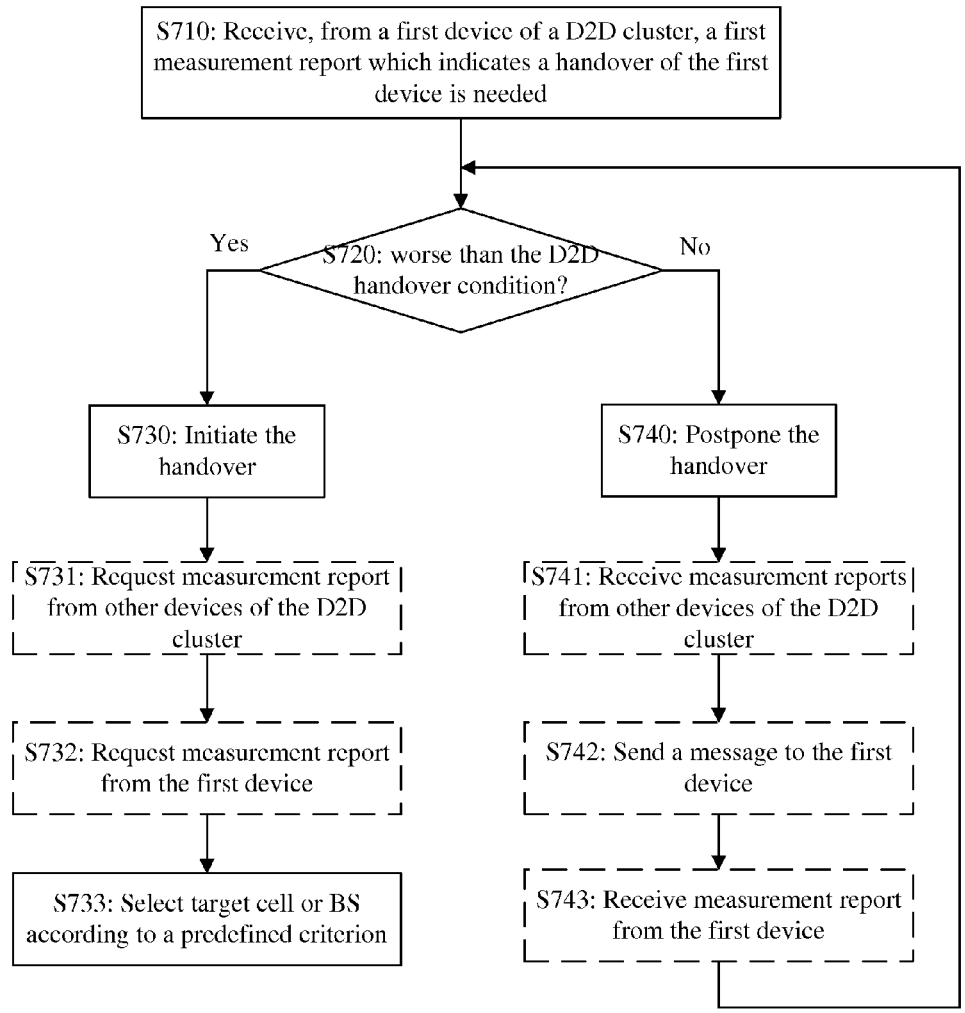
FIG. 7 illustrates an exemplary flowchart of a method at a base station according to embodiments of the present invention.

FIG. 7 illustrates an exemplary flowchart of a method at a source base station according to embodiments of the present invention.

At step S710, the source base station (e.g., BS1 in FIGS. 4-5) receives, from a first device (e.g., UE1 in FIGS. 4-5) of a D2D cluster, a first measurement report which indicates a handover of the first device is needed. As described above, the first measurement report may be triggered by the cellular handover condition or by the D2D handover condition.

Then, at step S720, the source base station determines, according to the D2D handover condition, whether to initiate or postpone the handover based on the first measurement report.

If the signal condition of the first device UE1 is worse than the D2D handover condition, then at step S730, BS1 can initiate the handover of UE1 immediately. However, if the signal condition of UE1 is better than the D2D handover condition, then at step S740, BS1 can postpone the handover of UE1.

When initiating the handover of UE1, BS1 may request measurement reports from at least one second device in the D2D cluster. The at least one second device may be all the other devices than the first device in the D2D cluster.

Specifically, at step S731, BS1 can send a measurement request to other UEs (e.g., UE2) in the D2D cluster if there is no valid measurement report of those UEs. Optionally, at step S732, BS1 may send a measurement request to UE1 if a previous measurement report (e.g., received at step S710) from UE1 has expired.

Upon gathering valid measurement reports from all the devices in the D2D cluster at step S731 and S732, BS1 can select a best target cell or a best target base station to which the devices (e.g., UE1 and UE2) of the D2D cluster are to be handed over according to a predefined criterion at step S733.

Having selected a target cell or target base station, BS1 can send a handover (HO) request for the devices (e.g., both UE1 and UE2) of the D2D cluster to the selected target base station (not shown).

Upon a failure of the joint handover to the best target cell or the best target base station, the source base station BS1 can select, according to the predefined criterion, a next-best target cell or a next-best target base station based on valid measurement reports of the devices of the D2D cluster.

Return to step S740, BS1 postpones the handover of UE1. In some embodiments, BS1 may receive a measurement report from another UE in the same D2D cluster at step S741, if that UE wants to handover to the same target base station or preferably the same target cell while the normal cellular handover of UE1 is postponed. Then, at an optional step S742, BS1 can send a message comprising a request for measurement report to UE1 if a previous measurement report received from UE1 has expired.

In further embodiments where the D2D cluster includes more than two devices, a joint handover of the D2D cluster may depend on measurement reports of all the devices in the D2D cluster. In other words, if the network decides to postpone a handover of a first device in the D2D cluster but all the other devices in the D2D cluster want to hand over to the same target base station or preferably the same target cell, then a joint handover may be initiated without further delay. Otherwise, a joint handover would be pending until the D2D handover condition is met at one of the device in the D2D cluster.

On the other hand, regardless whether the step S741 occurs, at the optional step S742, BS1 can send a message to UE1. The message instructs UE1 to control its sending of measurement report.

In one embodiment, the message may be an Acknowledgement message. In some embodiments, the message may comprise the D2D handover condition such that UE1 can subsequently use the D2D handover condition to trigger the sending of measurement report. Additionally or alternatively, the message may comprise a delay duration for postponing the sending of measurement report. If UE1 knows both the D2D handover condition and the delay duration, the event which occurs earlier can trigger the sending of measurement report. Depending on system configuration, UE1 can restart its periodical measurement and reporting, or merely perform measurement and reporting once in response to the triggering event. In this way, unnecessary event triggered reporting by UE1 may be avoided.

In another embodiment, if after a while, BS1 recognizes that the signal condition of UE1 meets the D2D handover condition for example by channel quality indicator or some other indicators (e.g., service quality) for on-going transmission or uplink measurements, BS1 can use this message to inform UE1 to send a measurement report if a previous measurement report received from UE1 has expired. In this case, the message comprises a request for measurement report.

Then, at step S743, BS1 may receive a valid measurement report (if any) from UE1 and the method goes back to step S720, where BS1 determines, according to the D2D handover condition, whether to initiate or postpone the handover based on the valid (i.e., newly received) measurement report. Alternatively, if the measurement report is received in response that all the other devices in the D2D cluster want to hand over to a same target base station or cell as UE1, then BS1 can initiate a joint handover of the D2D cluster to the target base station or cell without further delay (not shown in FIG. 7).

In some further embodiments, if prior to postponing the handover of UE1, BS1 finds that a same target base station or cell exists based on valid measurement reports of all the devices in a D2D cluster, BS1 can initiate a joint handover of the D2D cluster immediately without determination according to the D2D handover condition.

Figure 8:
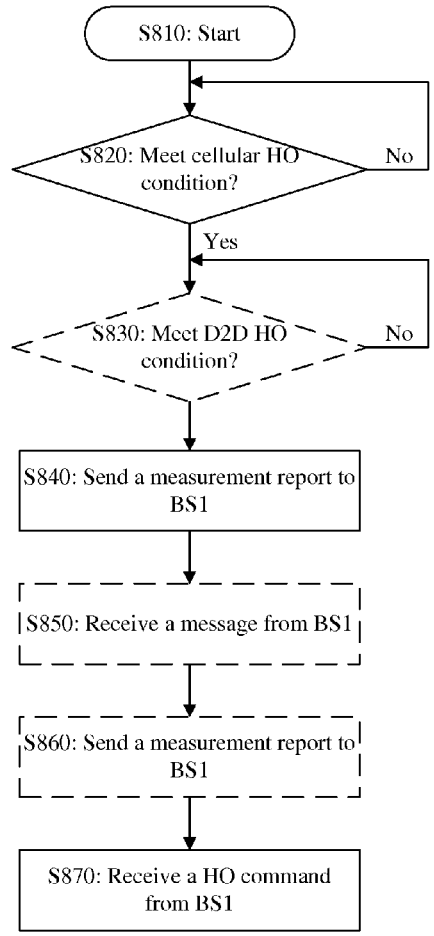
FIG. 8 illustrates an exemplary flowchart of a method at a first device of a D2D cluster according to embodiments of the present invention.

FIG. 8 illustrates an exemplary flowchart of a method at a first device of a D2D cluster according to embodiments of the present invention.

The method starts at step S810 and proceeds to step S820, where the first device (e.g., UE1 as shown in FIGS. 4-5) determines whether its signal condition meets the cellular handover condition. If no, the first device goes on with monitoring its signal condition. If yes, the method goes to an optional step S830.

At step S830, the first device determines whether its signal condition meets the D2D handover condition. If no, the first device goes on with monitoring its signal condition. If yes, the method goes to step S840.

At step S840, the first device sends a first measurement report to its source base station (e.g., BS1 in FIGS. 4-5). The first measurement report indicates that a handover of the first device is needed. Then, the first measurement report causes the source base station to determine, according to the D2D handover condition, whether to initiate or postpone the handover based on the first measurement report.

If the source base station determines to postpone the handover, then optionally, at step S850, a message may be received from the source base station. The message instructs the first device to control its sending of measurement report.

In some embodiments, the message is an Acknowledgement message, which may comprise the D2D handover condition such that UE1 can subsequently use the D2D handover condition to trigger the sending of measurement report. Additionally or alternatively, the message may comprise a delay duration for postponing the sending of measurement report.

In some other embodiments, the message may comprise a request for measurement report. For example, in a case where another UE in the same D2D cluster wants to handover to the same target cell as the first device while the normal cellular handover of the first device is postponed, such message may be sent by the source base station in order to obtain a valid measurement report. As another example, if after a while, BS1 recognizes that the signal condition of UE1 meets the D2D handover condition for example by channel quality indicator or some other indicators (e.g., service quality) for on-going transmission or uplink measurements, BS1 can use such message to request a measurement report from the first device.

Upon receiving the message at the step S850, the first device can control its sending of measurement report accordingly. Once a trigger event occurs, for example meeting the D2D handover condition, the delay duration expiring, or requested by the source base station, at step S860, the first device sends a measurement report to the source base station, such that the source base station can determine, according to the D2D handover condition, whether to initiate or postpone the handover based on the valid (i.e., newly received) measurement report.

Then at step S870, the first device can receive a handover command from the source base station if the source base station determines to initiate the handover.

Thereafter, the first device can execute handover.

Figure 9:
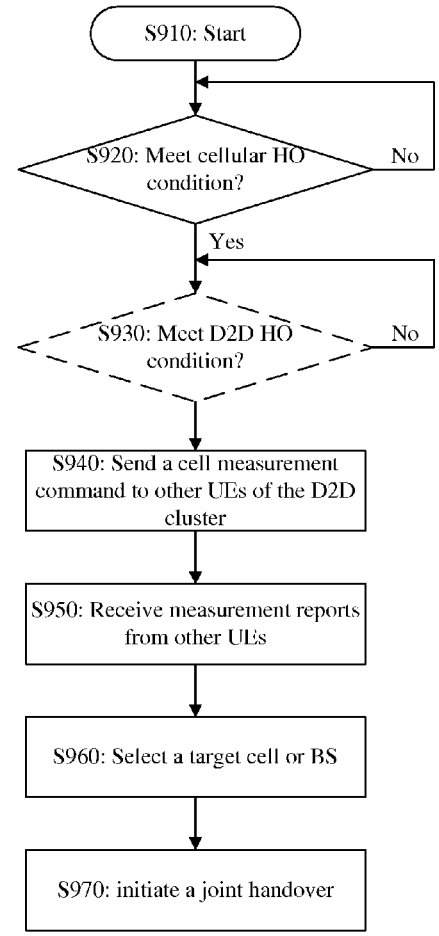
FIG. 9 illustrates another exemplary flowchart of a method at a first device of a D2D cluster according to embodiments of the present invention.

FIG. 9 illustrates another exemplary flowchart of a method at a first device of a D2D cluster according to embodiments of the present invention. The method of FIG. 9 may be implemented in a UE autonomous scenario as illustrated in FIG. 6.

The first few steps 910-930 are the same with steps 810-830 in FIG. 8, and thus the description thereof is omitted here.

At step S940, the first device sends a cell measurement command to other devices (e.g., UE2 in FIG. 6) in the same D2D cluster as the first device, in response to meeting the D2D handover condition.

Upon receiving a measurement report from UE2 at step S950, the first device UE1 can select a best target cell or a best target base station to which the devices (e.g., UE1 and UE2) of the D2D cluster are to be handed over according to a predefined criterion at step S960.

Having selected a target cell or target base station, at step S970, the first device UE1 can initiate a joint handover. Specifically, UE1 sends a handover (HO) request for the devices (e.g., both UE1 and UE2) of the D2D cluster to the source base station BS1. The handover request initiates a handover of the D2D cluster to the selected target cell or the selected target base station (e.g., BS3 in FIG. 6).

Figure 10:
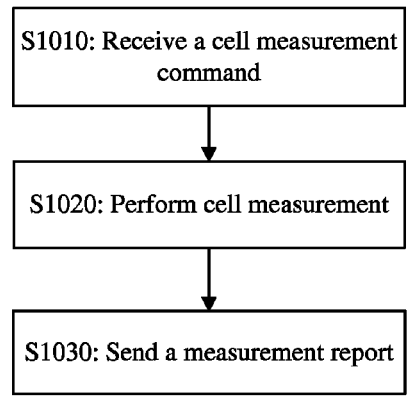
FIG. 10 illustrates an exemplary flowchart of a method at a second device of a D2D cluster according to embodiments of the present invention.

FIG. 10 illustrates an exemplary flowchart of a method at a second device of a D2D cluster according to embodiments of the present invention. In the D2D cluster, a first device (e.g., UE1 in FIGS. 4-6) and the second device (e.g., UE2 in FIGS. 4-6) have simultaneous cellular connection to BS1 and have an on-going optimized D2D path via BS1 by which a delay sensitive D2D application is in use.

At step S1010, the second device (e.g., UE2) receives a cell measurement command. The cell measurement command is triggered by the first device meeting the D2D handover condition.

In one embodiment, the measurement command is sent by a source base station of the first device (e.g., BS1 in FIGS. 4-5) when the source base station determines, according to the D2D handover condition, to initiate a handover of the first device based on a measurement report received from the first device.

In another embodiment, the measurement command is sent by the first device when the first device determines that its signal condition meets the D2D handover condition.

Then, at step S1020, upon receiving the cell measurement command, the second device UE2 performs measurement.

At step S1030, the second device sends a measurement report to the sender of the cell measurement command. Then, the receiver can use this measurement report to select a target cell or base station according to a predefined criterion. The detailed description about selecting the target cell or base station may reference to previous description with respect to the source bases station and the first device.

Finally, the second device can receive a joint handover command and execute the handover accordingly (not shown).

The above thus have illustrated exemplary signaling for a single mode connectivity case. One other case could be multi connectivity (e.g., dual mode). In the future, a UE could be connected to several cells/BSs. Then, the UE may keep D2D control in the previous base station to enable low latency D2D but it is handed over to another base station in the cellular communications domain. On the other hand, the optimal case would be keeping both cellular connectivity and D2D control in the same cell as long as QoS is satisfactory enough for either one.

Figure 11:
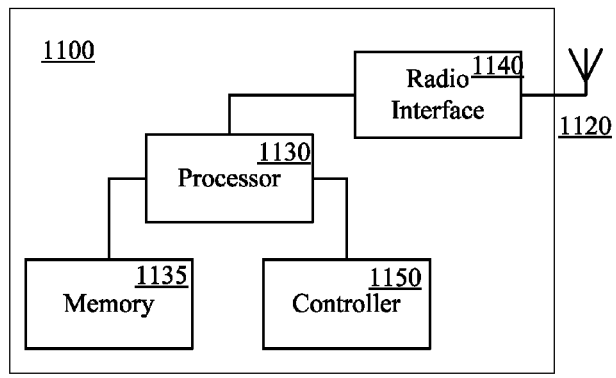
FIG. 11 illustrates an example of a user equipment.

FIG. 11 illustrates an example of a user equipment 1100, which may be implemented at one or more of user equipments UE1 and UE2 shown in FIGS. 1-6. The user equipment may include an antenna 1120. The user equipment may also includes a radio interface 1140, which may include other components, such as filters, converters (e.g., digital-to-analog converters and the like), symbol demappers, an Inverse Fast Fourier Transform (IFFT) module, and the like, to process symbols, such as OFDMA symbols, carried by a downlink or an uplink. In some implementations, the user equipment may also be compatible with IEEE 802.16, LTE, LTE-Advanced, and the like. The user equipments further includes a processor 1130 for controlling the user equipment and for accessing and executing program code stored in memory 1135.

Furthermore, the user equipment may include a controller 1150. For example, the controller 1150 may perform one or more of the D2D related mechanisms described herein including initiating measurements, initiating the transmission of measurement report, and the like.

Figure 12:
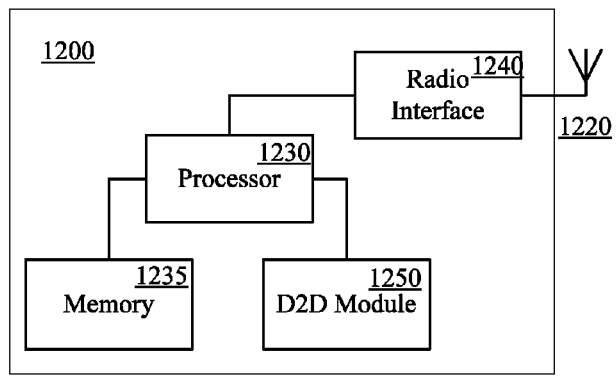
FIG. 12 illustrates an example of a base station.

FIG. 12 illustrates an example of a base station 1200, which may be implemented at base station BS1 shown in FIGS. 1-5. The base station may include an antenna 1220 configured to transmit and receive via downlinks, uplinks, and D2D links. The base station may further includes a radio interface 1240 coupled to the antenna 1220, a processor 1230 for controlling the base station and for accessing and executing program code stored in memory 1235. The radio interface 1240 may further include other components, such as filters, converters (e.g., digital-to-analog converters and the like), mappers, a Fast Fourier Transform (FFT) module, and the like, to generate symbols for a transmission via one or more downlinks and to receive symbols (e.g., via an uplink). In some implementations, the base station may also be compatible with IEEE 802.16, LTE, LTE-Advanced, and the like, and the radio frequency (RF) signals of downlinks and uplinks may be configured as an OFDMA signal. The base station may include a D2D module 1250. The D2D module 1250 may send, receive, and/or control aspects of the D2D mechanisms described herein with respect to the base station, eNB, and/or network.

Embodiments of the present invention have also provided apparatuses comprising means for performing each step as illustrated in conjunction with FIGS. 3-6. Therefore, for detailed operations of respective units in these apparatuses, please refer to the previous descriptions of the methods of the present invention with reference to FIGS. 3 to 6.

The present invention also provided a computer-readable storage media having computer program code stored thereon, the computer program code configured to, when executed, cause an apparatus to perform actions in the method as described hereinbefore. Further, there is provided a computer program product comprising a computer-readable storage media as provided in the present invention.

Exemplary embodiments of the present invention have been described above with reference to block diagrams and flowchart illustrations of methods, apparatuses (i.e., systems). It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The foregoing computer program instructions can be, for example, sub-routines and/or functions. A computer program product in one embodiment of the invention comprises at least one computer readable storage medium, on which the foregoing computer program instructions are stored. The computer readable storage medium can be, for example, an optical compact disk or an electronic memory device like a RAM (random access memory) or a ROM (read only memory).

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It should also be noted that the above described embodiments are given for describing rather than limiting the invention, and it is to be understood that modifications and variations may be resorted to without departing from the spirit and scope of the invention as those skilled in the art readily understand. Such modifications and variations are considered to be within the scope of the invention and the appended claims. The protection scope of the invention is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. An apparatus, comprising:
   at least one processor; and
   at least one memory including computer program code,
   wherein the at least one memory and the computer program code are configured to, with the at least one processor, cause the apparatus at least to:
   receive, from a first device of a device-to-device (D2D) cluster, a first measurement report which indicates that a handover of the first device is needed;
   determine, according to a D2D handover condition, whether to initiate or postpone the handover based on the first measurement report, wherein the D2D handover condition comprises a signal strength threshold, a signal quality threshold or a quality of service threshold, wherein initiating the handover comprises requesting at least one second measurement report from at least one second device of the D2D cluster and selecting, according to a predefined criterion, a best target cell or a best target base station for a joint handover of the first device and the at least one second device at least partly based on the first and the at least one second measurement reports; and
   upon a failure of the joint handover to the best target cell or the best target base station, select, according to said predefined criterion, a next-best target cell or a next-best target base station based on the first and the at least one second measurement reports.

2. The apparatus of claim 1, wherein the first measurement report is sent by the first device in response to meeting said D2D handover condition.

3. The apparatus of claim 1, wherein
   the at least one second measurement report is requested from at least one second device of the D2D cluster if there is no valid measurement report of the at least one second device; and wherein initiating the handover further comprises:
   requesting a valid first measurement report from the first device if the first measurement report has expired.

4. The apparatus of claim 3, wherein said predefined criterion is based on at least one of:
   signal condition;
   quality of service (QoS) requirements of both cellular service and D2D service of the first device and the at least one second device; and
   service priorities of both cellular service and D2D service of the first device and the at least one second device.

5. The apparatus of claim 1, wherein postponing the handover comprises:
   sending a message to the first device, said message instructing the first device to control the sending of measurement report.

6. The apparatus of claim 5, wherein said message comprises one or more of the following:
   the D2D handover condition for triggering the sending of measurement report;
   a delay duration for postponing the sending of measurement report; and
   a request for measurement report.

7. The apparatus of claim 1, wherein the signal strength threshold, the signal quality threshold and the quality of service (QoS) requirements are of both cellular service and D2D service.

8. The apparatus of claim 1, wherein said apparatus is further caused to:
   initiate, prior to said determining, a joint handover of the D2D cluster to the target base station or cell if the target base station or cell meets a cellular handover condition of all the devices in the D2D cluster.

9. An apparatus, comprising:
   at least one processor; and
   at least one memory including computer program code,
   wherein the at least one memory and the computer program code are configured to, with the at least one processor, cause the apparatus at least to:
   send, by a first device of a device-to-device (D2D) cluster, a first measurement report to a source base station of the first device, wherein said first measurement report indicates that a handover of the first device is needed and causes the source base station to determine, according to a D2D handover condition, whether to initiate or postpone the handover based on the first measurement report, wherein the D2D handover condition comprises a signal strength threshold, a signal quality threshold or a quality of service threshold;
   receiving a handover command to effect a joint handover of the first device and the at least one second device to a best target cell or a best target base station selected, according to a predefined criterion, at least partly based on the first measurement report and at least one second measurement report provided by at least one second device of the D2D cluster; and
   upon a failure of the joint handover to a best target cell or a best target base station, receiving a handover command to a next-best target cell or a next-best target base station selected, according to said predefined criterion, based on the first measurement report and the at least one second measurement report.

10. The apparatus of claim 9, wherein said sending comprises:
    sending said first measurement report in response to meeting said D2D handover condition.

11. The apparatus of claim 9, the apparatus is further caused to:
    receive a message from the source base station, said message instructing the first device to control the sending of measurement report.

12. The apparatus of claim 11, wherein said message comprises one or more of the following:
    the D2D handover condition for triggering the sending of measurement report;
    a delay duration for postponing the sending of measurement report; and
    a request for measurement report.

13. The apparatus of claim 9, wherein said predefined criterion is based on at least one of:
    signal condition;
    quality of service (QoS) requirements of both cellular service and D2D service of the first device and the at least one second device; and
    service priorities of both cellular service and D2D service of the first device and the at least one second device.

14. An apparatus, comprising:
at least one processor; and
at least one memory including computer program code,
wherein the at least one memory and the computer program code are configured to, with the at least one processor, cause the apparatus at least to:
receive, at a second device of a device-to-device (D2D) cluster, a cell measurement command, wherein said cell measurement command is triggered by a first device of the D2D cluster meeting a D2D handover condition, wherein the D2D handover condition comprises a signal strength threshold, a signal quality threshold or a quality of service threshold;
send a second measurement report in response to said cell measurement command;
receiving a handover command to effect a joint handover of the first device and the second device to a best target cell or a best target base station selected, according to a predefined criterion, at least partly based on first measurement report provided by the first device of the D2D cluster and the second measurement report; and
upon a failure of the joint handover to a best target cell or a best target base station, receiving a handover command to a next-best target cell or a next-best target base station selected, according to said predefined criterion, based on the first measurement report and the second measurement report.

15. The apparatus of claim 14, wherein said cell measurement command is sent by the first device.

16. The apparatus of claim 14, wherein said cell measurement command is sent by a base station.

\* \* \* \* \*